(12) United States Patent
Zhu

(10) Patent No.: US 11,937,655 B2
(45) Date of Patent: Mar. 26, 2024

(54) FLAME-RETARDANT ANTISTATIC REGENERATED POLYESTER WIG FIBER AND PREPARATION METHOD THEREOF

(71) Applicant: XUCHANG HONGYANG BIOCHEMICAL INDUSTRIAL DEVELOPMENT CO., LTD., Henan (CN)

(72) Inventor: Wentong Zhu, Xuchang (CN)

(73) Assignee: XUCHANG HONGYANG BIOCHEMICAL INDUSTRIAL DEVELOPMENT CO., LTD., Xuchang (CN)

( * ) Notice: Subject to any disclaimer, the term of this patent is extended or adjusted under 35 U.S.C. 154(b) by 0 days.

(21) Appl. No.: 18/350,141

(22) Filed: Jul. 11, 2023

(65) Prior Publication Data

US 2024/0023657 A1 Jan. 25, 2024

(30) Foreign Application Priority Data

Jul. 11, 2022 (CN) .......................... 202210812184.6

(51) Int. Cl.
| | |
|---|---|
| A41G 3/00 | (2006.01) |
| C08G 63/183 | (2006.01) |
| C08J 3/22 | (2006.01) |
| C08J 11/24 | (2006.01) |
| C08K 3/26 | (2006.01) |
| C08K 3/36 | (2006.01) |
| C08K 5/11 | (2006.01) |
| C08K 5/20 | (2006.01) |
| C08K 5/5373 | (2006.01) |
| C08K 5/5399 | (2006.01) |
| C08L 67/02 | (2006.01) |
| C08L 85/02 | (2006.01) |

(52) U.S. Cl.
CPC .......... *A41G 3/0083* (2013.01); *C08G 63/183* (2013.01); *C08J 3/22* (2013.01); *C08J 11/24* (2013.01); *C08K 3/26* (2013.01); *C08K 3/36* (2013.01); *C08K 5/11* (2013.01); *C08K 5/20* (2013.01); *C08K 5/5373* (2013.01); *C08K 5/5399* (2013.01); *C08L 67/02* (2013.01); *C08L 85/02* (2013.01); *C08J 2367/02* (2013.01); *C08K 2003/265* (2013.01); *C08K 2201/011* (2013.01); *C08K 2201/014* (2013.01); *C08L 2201/02* (2013.01); *C08L 2201/04* (2013.01); *C08L 2203/12* (2013.01); *C08L 2207/20* (2013.01); *C08L 2310/00* (2013.01)

(58) Field of Classification Search
CPC .......................... A41G 3/0083; C08K 5/5399
See application file for complete search history.

(56) References Cited

U.S. PATENT DOCUMENTS

| | | | |
|---|---|---|---|
| 2004/0195543 A1 | 10/2004 | Masuda et al. | |
| 2007/0184264 A1* | 8/2007 | Masuda | D01F 6/92 428/364 |
| 2015/0197875 A1* | 7/2015 | Kim | D01F 1/10 264/141 |
| 2016/0348279 A1* | 12/2016 | Ramappa | D03D 15/283 |
| 2017/0356103 A1* | 12/2017 | Kim | A41G 3/0083 |
| 2023/0028500 A1* | 1/2023 | Roth | C08L 67/02 |

FOREIGN PATENT DOCUMENTS

| | | |
|---|---|---|
| CN | 103173887 A | 6/2013 |
| CN | 106222789 A | 12/2016 |
| CN | 107128044 A | 9/2017 |
| CN | 107739434 A | 2/2018 |
| CN | 109957849 A | 7/2019 |
| CN | 112048781 A | 12/2020 |

OTHER PUBLICATIONS

Notification to Grant Patent Right for Invention in Chinese Application No. 202210612184.6 dated Sep. 11, 2023, 4 pages.
First Office Action in Chinese Application No. 202210612184.6 dated May 20, 2023, 17 pages.

* cited by examiner

*Primary Examiner* — Liam J Heincer
(74) *Attorney, Agent, or Firm* — Runzhi Lai

(57) ABSTRACT

The present disclosure provides a flame retardant and antistatic regenerated polyester wig fiber and a preparation method thereof, and relates to the field of simulated wig technology. A composite flame retardant composed of poly (sulfonyldiphenylene phenylphosphonate) (PSPPP), a derivative of 9,10-dihydro-9-oxa-10-phosphaphenanthrene-10-oxide (DOPO-FT), and 9,10-dihydro-9-oxa-10-phosphaphenanthrene-10-oxide triphosphonitrile (DOPO-TPN), and biomass-derived graphene are subjected to a re-polymerization reaction with an alcoholysis product BHET of a waste PET bottle flake, respectively to obtain an in-situ modified flame retardant regenerated masterbatch and an antistatic regenerated polyester masterbatch. The masterbatches are blended and melt-spun with regenerated polyester, so that the obtained wig fiber has good flame retardant property, better flame retardant coefficient and antistatic property, and a significant antibacterial effect, thereby increasing the safety of the wig. The recycled and regenerated polyester from the PET bottle is utilized, effectively reducing environmental pollution caused by waste polyester, and contributing to resource conservation and sustainable development.

7 Claims, No Drawings

FLAME-RETARDANT ANTISTATIC REGENERATED POLYESTER WIG FIBER AND PREPARATION METHOD THEREOF

CROSS-REFERENCE TO RELATED APPLICATIONS

This application claims priority of Chinese Application No. 202210812184.6, filed on Jul. 11, 2022, the entire contents of which are incorporated herein by reference.

TECHNICAL FIELD

The present disclosure relates to the field of simulated wig technology, and more particularly, to flame retardant and antistatic regenerated polyester wig fibers and preparation methods thereof.

BACKGROUND

With rapid economic development and changes in people's living habits, wigs have become increasingly involved in daily life. Currently, the majority of wigs available on the market are made of synthetic wig fibers, which are mainly made of synthetic fibers such as polypropylene, polyvinyl chloride, and polyester. The raw materials used to produce these synthetic fibers are derived from petroleum. In recent years, chemical fiber products, represented by polyester, have played an increasingly significant role in daily life. However, due to a growing scarcity of natural resources such as petroleum and an increasing demand for output, attention has shifted to the production of regenerated polyester fibers. The regenerated polyester fibers have gained attention due to their environmentally friendly and sustainable advantages.

The regenerated polyester fiber is a type of regenerated chemical fiber obtained by recycling and reprocessing waste polyester materials through physical or chemical techniques and spinning. The polyester materials used in the production of regenerated polyester fibers mainly come from regenerated polyester bottles, waste fibers, waste materials generated during the production of polyester fibers, waste polyester textiles, etc. Recycling of 1 t waste polyester may reduce 6 t of petroleum consumption and 32 t of carbon dioxide emissions. Therefore, the research on regenerated polyester fibers has significant environmental implications. Currently, regenerated polyester fibers are mostly used in textile fibers, packaging, and other industries, and there are few studies on the application of regenerated polyester fibers in the preparation of wig fibers.

Since the wig is worn and used in direct or indirect contact with the human body, it needs to possess good flame retardant and antistatic properties to ensure its safety performance. Patent Application CN 109957849 A discloses a regenerated polyester elastic wig filament made of a bottle flake, which relates to wig fibers that do not have flame retardant and antistatic effects. Regenerated polyester itself does not possess flame retardant property, so it needs to undergo flame retardant modification in actual production to increase the safety of the product. In recent years, halogen-based flame retardants have dominated the flame retardant market due to their relatively low cost and high flame retardant efficiency. However, the halogen-based flame retardants also release a large amount of hydrogen halide gas during combustion, which is highly corrosive and may cause secondary harm. As a result, non-halogen flame retardants have received increasing attention. Regenerated polyester has poor antistatic property, similar to polyester, making it prone to static electricity generation and dust accumulation, which may affect product quality. In addition, the body friction may cause static electricity accumulation, affecting personal safety of processing workers. Moreover, after wearing a wig, the scalp temperature tends to be relatively high due to poor heat dissipation, which may lead to degradation, discoloration, and bacterial growth caused by acidic or alkaline metabolites, potentially causing certain skin diseases. Therefore, it is desirable and significant to produce wigs with flame retardant and antistatic properties, and certain antibacterial capabilities.

SUMMARY

(I) Technical Problems Solved

In view of the deficiencies in the prior art, the present disclosure provides a flame retardant and antistatic regenerated polyester wig fiber and a preparation method thereof. The wig fiber of the present disclosure possesses flame retardant, dripping resistant, and antistatic properties, as well as antibacterial effects while being environmentally friendly, thereby enhancing the safety property of the wig fiber.

(II) Technical Solutions

To achieve the above objectives, the present disclosure is implemented through the following technical solutions.

As one aspect, the present disclosure provides a flame retardant and antistatic regenerated polyester wig fiber. The wig fiber is made of the following components in parts by weight: 40-50 parts of regenerated polyester, 20-30 parts of modified flame retardant regenerated polyester masterbatch, 15-25 parts of modified antistatic regenerated polyester masterbatch, 1-2 parts s of colorant, 3-5 parts of additive, 1.5-3 parts of dispersant, and 1-1.5 parts of plasticizer.

Furthermore, as an optimization of the flame retardant and antistatic regenerated polyester wig fiber, the modified flame retardant regenerated polyester masterbatch includes a composite flame retardant composed of poly(sulfonyldiphenylene phenylphosphonate) (PSPPP), a derivative of 9,10-dihydro-9-oxa-10-phosphaphenanthrene-10-oxide (DOPO-FT), and 9,10-dihydro-9-oxa-10-phosphaphenanthrene-10-oxide triphosphate (DOPO-TPN) with a mass ratio of (2-4):(0.5-2):(3-5). The modified antistatic polyester masterbatch includes biomass-derived graphene.

Furthermore, as an optimization of the flame retardant and antistatic regenerated polyester wig fiber, the modified flame retardant regenerated polyester is prepared by a process including following steps.

(1) cutting, grinding, washing, and drying a waste PET bottle flake to keep a moisture content within 50 ppm to obtain clean and dry waste PET bottle flake powder.

(2) placing the waste PET bottle flake powder obtained in step (1) into an alcoholysis reactor and adding an ethylene glycol solution by a weight of 4-6 times a weight of the waste PET bottle flake powder, zinc acetate in a weight ratio of 4-8% to a total weight of the waste PET bottle flake powder, and ethylene terephthalate (BHET) in a weight ratio of 1-3% to the total weight of the waste PET bottle flake powder into the alcoholysis reactor, conducting an alcoholysis reaction at 210-250° C. and a vacuum degree of 0.3-0.5 MPa for 15-25 min, and then filtering a molten PET bottle flake material after alcoholysis to obtain an alcoholysis product BHET;

(3) preparing a flame retardant suspension with the composite flame retardant composed of the PSPPP, the derivative of DOPO-FT, and the DOPO-TPN with a mass ratio of (2-4):(0.5-2):(3-5) and ethylene glycol by ultrasonic oscillation; and (4) adding the alcoholysis product BHET obtained in step (2) and the flame retardant suspension obtained in step (3) into a polymerization reactor together with antimony trioxide and polyphosphoric acid to react at a temperature of 265° C.-275° C. for 4-5 h while maintaining a vacuum degree of 0.9-1 MPa, which is regarded as a system, a total weight of the composite flame retardant in the flame retardant suspension accounting for 15%-25% of the weight ratio of the alcoholysis product BHET, then causing the system to 25° C. and 0.1 MPa at a uniform speed of 5° C./min and 16 kPa/min after the reaction, and then cooling in a cold water tank and pelletizing to obtain the modified flame retardant regenerated polyester masterbatch.

Furthermore, as an optimization of the flame retardant and antistatic regenerated polyester wig fiber, the modified antistatic regenerated polyester is prepared by a process including following steps.

(1) cutting, grinding, washing, and drying the waste PET bottle flake to keep a moisture content within 50 ppm to obtain waste PET bottle flake powder;

(2) placing the waste PET bottle flake powder obtained in step (1) into an alcoholysis reactor and adding an ethylene glycol solution 4-6 times the weight of the waste PET bottle flake powder, adding zinc acetate in a weight ratio of 4-8% to a total weight of the waste PET bottle flake powder, and adding ethylene terephthalate (BHET) in a weight ratio of 1-3% to the total weight of the waste PET bottle flake powder, respectively to conduct an alcoholysis reaction at 210-250° C. and 0.3-0.5 MPa for 15-25 min, and then filtering a molten PET bottle flake material after alcoholysis to obtain an alcoholysis product BHET;

(3) preparing an antistatic suspension: preparing a uniform antistatic suspension with the biomass-derived graphene and ethylene glycol by ultrasonic oscillation; and (4) adding the alcoholysis product BHET obtained in step (2) and the antistatic suspension obtained in step (3) into a polymerization reactor together with antimony trioxide and polyphosphoric acid to react at 255° C.-265° C. for 3-4 h while maintaining a vacuum degree of 1-1.2 MPa to obtain a system, then reducing the system to 25° C. and 0.1 MPa at a uniform speed of 5° C./min and 16 kPa/min, and then cooling in a cold water tank and pelletizing to obtain the modified antistatic regenerated polyester masterbatch.

Furthermore, as an optimization of the flame retardant and antistatic regenerated polyester wig fiber, the colorant is at least one of color powder, a pigment, or a color masterbatch; the additive is one or more of nano-calcium carbonate, silica dioxide, talcum powder, silicon micro-powder, titanium dioxide, or a glass microsphere; the dispersant is ethylene bis-stearamide or polyethylene wax with a molecular weight of 2600-3000; and the plasticizer is acetyl tributyl citrate.

As another aspect, the present disclosure further provides a method for preparing a flame retardant and antistatic regenerated polyester wig fiber, comprising following steps.

(1) taking raw materials in parts by weight, including: 40-50 parts of regenerated polyester, 20-30 parts of modified flame retardant regenerated polyester masterbatch, 15-25 parts of modified antistatic regenerated polyester masterbatch, 1-2 parts of colorant, 3-5 parts of additive, 1.5-3 parts of dispersant, and 1-1.5 parts of plasticizer, and drying the raw materials at a temperature of 85° C.-95° C. to remove moisture, a total drying time being 5-7 h, and a moisture content of the raw materials being controlled within 50 ppm;

(2) feeding the raw materials obtained in step (1) into a single-screw extruder for screw melting extrusion to obtain a primary fiber, wherein an aperture of a spinneret is in a range of 0.5 mm to 1 mm, and a temperature of the single-screw extruder is in a range of 240° C. to 260° C.;

(3) cooling the primary fiber obtained in step (2) using a blowing or a side blowing manner with a cooling ring with 1 m-5 m at an air temperature of 0° C.-15° C.;

(4) applying oil to the primary fiber obtained in step (3) with an oil roller to obtain an oiled primary fiber, stretching the oiled primary fiber using a drawing machine to obtain a fiber bundle, and collecting the fiber bundle using a winding machine to obtain a fiber roll, wherein a stretching temperature during a stretching process is in a range of 110° C. to 120° C., and a rotation speed is in a range of 500 m/m in to 550 m/m in; the oil is one or more of a polyether-based polymer, a fatty acid-based polymer, an organic amine salt compound, or an organic silicone compound; and the drawing machine has 6-10 rolls with a draw ratio of 3.2-5.8 times.

(5) placing the fiber roll obtained in step (4) into a bundling frame to guide the fiber bundle into a heat setting box through a traction roller to conduct a heat setting process, wherein a length of the heat setting box is in a range of 2 to 18 m, a working temperature of a heat setting machine is in a range of 170° C. to 180° C., a feeding speed of the fiber bundle is in a range of 5 m/min to 10 m/m in, and a residence time of the fiber bundle in the heat setting box is in a range of 10 to 15 min; and (6) after the heat setting process is completed, obtaining the flame retardant and antistatic regenerated polyester wig fiber by collecting and packaging the fiber bundle obtained in step (5) through a fiber collecting machine.

(III) Beneficial Effects

The simulated wig fiber, having good suppleness, glossiness, excellent elasticity, strong wear resistance, environmentally friendly property, etc., is prepared by using the regenerated polyester, the modified flame retardant regenerated polyester masterbatch, and the modified antistatic regenerated polyester masterbatch as the raw materials. The composite flame retardant composed of the PSPPP, the derivative of DOPO-FT, and the DOPO-TPN and the biomass-derived graphene are subjected to the re-polymerization reaction with the alcoholysis product BHET of the waste PET bottle flake, respectively to obtain the in-situ modified flame retardant regenerated polyester masterbatch and the antistatic regenerated polyester masterbatch. The aforementioned masterbatches are blended and melt-spun with the regenerated polyester, so that the prepared wig fiber has high flame retardant property, and effectively improves the flame retardant coefficient and the antistatic property of the wig fiber. Meanwhile, the wig fiber has a significant antibacterial effect against *Staphylococcus aureus*, *Escherichia coli*, and *Candida albicans*, thereby increasing the safety property of the wig. The use of the waste PET bottle flake in the present disclosure effectively reduces environmental pollution caused by waste polyester and contributes to resource conservation and sustainable development.

DETAILED DESCRIPTION

In order to more clearly illustrate the purpose, technical solutions, and beneficial effects of the embodiments of the present disclosure, the following detailed description of the technical solutions in the embodiments of the present disclosure will be provided in conjunction with the embodiments of the present disclosure. It should be understood that the described embodiments are only a part of the embodiments of the present disclosure, rather than all embodiments. Based on the embodiments of the present disclosure, all other embodiments that are obtained by those skilled in the art without inventive labor are within the scope of protection of the present disclosure.

Example 1

In this Example, components in parts by weight for preparing a flame retardant and antistatic regenerated polyester wig fiber included: 40 parts of regenerated polyester, 30 parts of modified flame retardant regenerated polyester masterbatch, 15 parts of modified antistatic regenerated polyester masterbatch, 2 parts of color powder, 3 parts of additives (nano calcium carbonate, silica, and talcum powder), 3 parts of ethylene bis-stearamide, and 1 part of tributyl acetyl citrate. The modified flame retardant regenerated polyester masterbatch included a composite flame retardant composed of poly (sulfonyldiphenylene phenylphosphonate) (PSPPP), a derivative of 9,10-dihydro-9-oxa-10-phosphaphenanthrene-10-oxide (DOPO-FT), and 9,10-dihydro-9-oxa-10-phosphaphenanthrene-10-oxide triphosphonitrile (DOPO-TPN) with a weight ratio of 2:0.5:3.

Example 2

In this Example, components in parts by weight for preparing a flame retardant and antistatic regenerated polyester wig fiber included: 50 parts of regenerated polyester, 20 parts of modified flame retardant regenerated polyester masterbatch, 25 parts of modified antistatic regenerated polyester masterbatch, 1 part of pigment, 5 parts of additives (silica, titanium dioxide, and glass microspheres), 1.5 parts of ethylene bis-stearamide, and 1.5 parts of tributyl acetyl citrate. The modified flame retardant regenerated polyester masterbatch included a composite flame retardant composed of PSPPP, a derivative of DOPO-FT, and DOPO-TPN with a weight ratio of 4:2:5.

Example 3

In this Example, components in parts by weight for preparing a flame retardant and antistatic regenerated polyester wig fiber included: 40 parts of regenerated polyester, 20 parts of modified flame retardant regenerated polyester masterbatch, 15 parts of modified antistatic regenerated polyester masterbatch, 1 part of color masterbatch, 3 parts of additives (nano calcium carbonate, silica, titanium dioxide, and glass microspheres), 1.5 parts of polyethylene wax with a molecular weight of 2600-3000, and 1 part of tributyl acetyl citrate. The modified flame retardant regenerated polyester masterbatch included a composite flame retardant composed of PSPPP, a derivative of DOPO-FT, and DOPO-TPN with a weight ratio of 2:2:5.

Example 4

In this Example, components in parts by weight for preparing a flame retardant and antistatic regenerated polyester wig fiber included: 50 parts of regenerated polyester, 30 parts of modified flame retardant regenerated polyester masterbatch, 25 parts of modified antistatic regenerated polyester masterbatch, 2 parts of color masterbatch, 5 parts of additives (nano calcium carbonate, silica, talcum powder, silica micro-powder, titanium dioxide, and glass microspheres), 3 parts of polyethylene wax with a molecular weight of 2600-3000, and 1.5 parts of tributyl acetyl citrate. The modified flame retardant regenerated polyester pellet included a composite flame retardant composed of PSPPP, a derivative of DOPO-FT, and DOPO-TPN with a weight ratio of 4:2:3.

Example 5

A modified flame retardant regenerated polyester masterbatch was prepared by a process including following steps.
(1) Cutting, grinding, washing, and drying a waste PET bottle flake to keep a moisture content within 50 ppm to obtain waste PET bottle flake powder.
(2) Placing the waste PET bottle flake powder obtained in step (1) into an alcoholysis reactor and adding an ethylene glycol solution by a weight of 4-6 times a weight of the waste PET bottle flake powder, zinc acetate in a weight ratio of 4-8% to a total weight of the waste PET bottle flake powder, and ethylene terephthalate (BHET) in a weight ratio of 1-3% to the weight mass of the waste PET bottle flake powder into the alcoholysis reactor, conducting an alcoholysis reaction at a temperature of 210° C.-250° C. and a vacuum degree of 0.3-0.5 MPa for 15-25 min, and then filtering a molten PET bottle flake material after alcoholysis to obtain an alcoholysis product BHET.
(3) Preparing a flame retardant suspension with a composite flame retardant composed of PSPPP, a derivative of DOPO-FT, and DOPO-TPN with a mass ratio of 3:0.5:5 and ethylene glycol by ultrasonic oscillation.
(4) Adding the alcoholysis product BHET obtained in step (2) and the flame retardant suspension obtained in step (3) into a polymerization reactor together with antimony trioxide and polyphosphoric acid to react at a temperature of 265° C.-275° C. for 4-5 h while maintaining a vacuum degree of 0.9-1 MPa, which is regarded as a system, a total weight of the composite flame retardant in the flame retardant suspension accounting for 25% of a weight ratio of the alcoholysis product BHET, then causing the system at 25° C. and 0.1 MPa at a uniform speed of 5° C./min and 16 kPa/min after the reaction, and then cooling in a cold water tank and pelletizing to obtain the modified flame retardant regenerated polyester masterbatch.

Example 6

Compared with Example 5, a difference of the Example 6 was a following step.
Preparing a flame retardant suspension in step (3): a uniform flame retardant suspension was prepared with a composite flame retardant composed of PSPPP, a derivative of DOPO-FT, and DOPO-TPN with a mass ratio of 4:0.5:3 and ethylene glycol by ultrasonic oscillation.

Example 7

Compared with Example 5, a difference of the Example 7 was a following step.
preparing a flame retardant suspension in step (3): a uniform flame retardant suspension was prepared with a composite flame retardant composed of PSPPP, a derivative of DOPO-FT, and DOPO-TPN with a mass ratio of 2:2:3 and ethylene glycol by ultrasonic oscillation.

Example 8

Compared with the Example 5, a difference of the Example 8 was a following step.

In step (4), a total weight of the composite flame retardant in the flame retardant suspension accounted for 15% of a weight ratio of the alcoholysis product BHET.

Example 9

Compared with the Example 5, a difference of the Example 9 was a following step.

In step (4), a total weight of the composite flame retardant in the flame retardant suspension accounted for 20% of a weight ratio of the alcoholysis product BHET.

Example 10

A modified antistatic regenerated polyester was prepared by a process including following steps.
(1) Cutting, grinding, washing, and drying the waste PET bottle flake to keep a moisture content within 50 ppm to obtain waste PET bottle flake powder.
(2) Placing the waste PET bottle flake powder obtained in step (1) into an alcoholysis reactor and adding an ethylene glycol solution 4-6 times the weight of the waste PET bottle flake powder, adding zinc acetate in a weight ratio of 4-8% to a total weight of the waste PET bottle flake powder, and adding ethylene terephthalate (BHET) in a weight ratio of 1-3% to the total weight of the waste PET bottle flake powder, respectively to conduct an alcoholysis reaction at 210-250° C. and 0.3-0.5 MPa for 15-25 min, and then filtering a molten PET bottle flake material after alcoholysis to obtain an alcoholysis product BHET.
(3) Preparing an antistatic suspension: preparing a uniform antistatic suspension biomass-derived graphene and ethylene glycol by ultrasonic oscillation.
(4) Adding the alcoholysis product BHET obtained in step (2) and the flame retardant suspension obtained in step (3) into a polymerization reactor together with antimony trioxide and polyphosphoric acid to react at 255° C.-265° C. for 3-4 h while maintaining a vacuum degree of 1-1.2 MPa, then reducing the system to 25° C. and MPa at a uniform speed of 5° C./min and 16 kPa/min, and then cooling in a cold water tank and pelletizing to obtain the modified antistatic regenerated polyester masterbatch.

Example 11

Compared with the Example 10, a difference of the Example 11 was a following step.

In step (4), a total weight of the biomass-derived graphene in the antistatic suspension accounted for 10% of a weight ratio of the alcoholysis product BHET.

Example 12

Compared with the Example 10, a difference of the Example 12 was a following step.

In step (4), a total weight of the biomass-derived graphene in the antistatic suspension accounted for 12.5% of a weight ratio of the alcoholysis product BHET.

In Examples 13-21, a colorant was at least one of color powder, a pigment, or a color masterbatch; an additive was one or more of nano-calcium carbonate, silica dioxide, talcum powder, silicon micro-powder, titanium dioxide, or a glass microsphere; a dispersant was ethylene bis-stearamide or polyethylene wax with a molecular weight of 2600-3000; and a plasticizer was acetyl tributyl citrate.

Example 13

A flame retardant and antistatic regenerated polyester wig fiber was prepared by a process including the following steps.
(1) Taking raw materials in parts by weight, including: 50 parts of regenerated polyester, 30 parts of the modified flame retardant regenerated polyester masterbatch prepared in the Example 5, 25 parts of the modified antistatic regenerated polyester masterbatch prepared in the Example 10, 1 part of colorant, 4 parts of additive, 2 parts of dispersant, and 1 part of plasticizer, and drying the raw materials at a temperature of 90° C. to remove moisture, a total drying time being 5-7 h, and a moisture content of the raw materials being controlled within 50 ppm.
(2) Feeding the raw materials obtained in step (1) into a single-screw extruder for screw melting extrusion to obtain a primary fiber, wherein an aperture of a spinneret was 0.8 mm, and a temperature of the single-screw extruder was 250° C.
(3) Cooling the primary fiber obtained in step (2) using a blowing manner with a 1-5 m cooling ring at an air temperature of 0° C.
(4) Applying oil to the primary fiber obtained in step (3) with an oil roller to obtain an oiled primary fiber, stretching the oiled primary fiber using a drawing machine to obtain a fiber bundle, and collecting the fiber bundle using a winding machine to obtain a fiber roll, wherein a stretching temperature during a stretching process was 120° C., and a rotation speed was 550 m/m in; the oil was one or more of a polyether-based polymer, a fatty acid-based polymer, an organic amine salt compound, or an organic silicone compound; and the drawing machine had 8 rolls with a draw ratio of 4.2 times.
(5) Placing the fiber roll obtained in step (4) into a bundling frame to guide the fiber bundle into a heat setting box through a traction roller to conduct a heat setting process, wherein a length of the heat setting box was 15 m, a working temperature of a heat setting machine was 180° C., a feeding speed of the fiber bundle was 5 m/m in, and a residence time of the fiber bundle in the heat setting box was 10 min.
(6) After the heat setting process was completed, obtaining the flame retardant and antistatic regenerated polyester wig fiber by collecting and packaging the fiber bundle obtained in step (5) through a fiber collecting machine.

The colorant was at least one of color powder, a pigment, or a color masterbatch, and a color was chosen according to customer requirements; the additive was one or more of nano-calcium carbonate, silica dioxide, talcum powder, silicon micro-powder, titanium dioxide, or a glass microsphere; the dispersant was ethylene bis-stearamide or polyethylene wax with a molecular weight of 2600-3000; and the plasticizer was acetyl tributyl citrate.

Example 14

Compared with the Example 13, a difference of the Example 14 was as follows.

A flame retardant and antistatic regenerated polyester wig fiber comprised following raw materials in parts by weight. 50 parts of regenerated polyester, 30 parts of the modified flame retardant regenerated polyester masterbatch prepared in Example 8, 25 parts of the modified antistatic regenerated polyester masterbatch prepared in Example 10, 1 part of colorant, 4 parts of additive, 2 parts of dispersant, and 1 part of plasticizer.

Example 15

Compared with the Example 13, a difference of the Example 15 was as follows. A flame retardant and antistatic regenerated polyester wig fiber comprised the following raw materials in parts by weight.

50 parts of regenerated polyester, 30 parts of the modified flame-retardant regenerated polyester masterbatch prepared in Example 9, 25 parts of the modified antistatic regenerated polyester masterbatch prepared in Example 10, 1 part of colorant, 4 parts of additive, 2 parts of dispersant, and 1 part of plasticizer.

Example 16

Compared with the Example 13, a difference of the Example 16 was as follows. A flame retardant and antistatic regenerated polyester wig fiber comprised the following raw materials in parts by weight.

50 parts of regenerated polyester, 30 parts of the modified flame-retardant regenerated polyester masterbatch prepared in the Example 6, 25 parts of the modified antistatic regenerated polyester masterbatch prepared in Example 10, 1 part of colorant, 4 parts of additive, 2 parts of dispersant, and 1 part of plasticizer.

Example 17

Compared with the Example 13, a difference of the Example 17 was as follows. A flame retardant and antistatic regenerated polyester wig fiber comprised the following raw materials in parts by weight.

50 parts of regenerated polyester, 30 parts of the modified flame-retardant regenerated polyester masterbatch prepared in the Example 7, 25 parts of the modified antistatic regenerated polyester masterbatch prepared in the Example 10, 1 part of colorant, 4 parts of additive, 2 parts of dispersant, and 1 part of plasticizer.

Example 18

Compared with the Example 13, a difference of the Example 18 was as follows. A flame retardant and antistatic regenerated polyester wig fiber comprised the following raw materials in parts by weight.

50 parts of regenerated polyester, 30 parts the of modified flame-retardant regenerated polyester masterbatch prepared in the Example 5, 25 parts of the modified antistatic regenerated polyester masterbatch prepared in Example 11, 1 part of colorant, 4 parts of additive, 2 parts of dispersant, and 1 parts of plasticizer.

Example 19

Compared with the Example 13, a difference of the Example 19 was as follows. A flame retardant and antistatic regenerated polyester wig fiber comprised the following raw materials in parts by weight.

50 parts of regenerated polyester, 30 parts of the modified flame retardant regenerated polyester masterbatch prepared in the Example 7, 25 parts of the modified antistatic regenerated polyester masterbatch prepared in the Example 12, 1 part of colorant, 4 parts of additive, 2 parts of dispersant, and 1 part of plasticizer.

Example 20

Compared with the Example 13, a difference of the Example 20 was as follows. A flame retardant and antistatic regenerated polyester wig fiber comprised the following raw materials in parts by weight.

40 parts of regenerated polyester, 20 parts of the modified flame retardant regenerated polyester masterbatch prepared in the Example 5, 15 parts of the modified antistatic regenerated polyester masterbatch prepared in the Example 10, 1 part of colorant, 3 parts of additive, 1.8 parts of dispersant, and 1 part of plasticizer.

Example 21

Compared with the Example 13, a difference of the Example 21 was as follows. A flame retardant and antistatic regenerated polyester wig fiber comprised the following raw materials in parts by weight.

45 parts of regenerated polyester, 25 parts of the modified flame retardant regenerated polyester masterbatch prepared in the Example 5, 20 parts of the modified antistatic regenerated polyester masterbatch prepared in the Example 10, 1.4 parts of colorant, 3.5 parts of additive, 2 parts of dispersant, and 1.2 parts of plasticizer.

A diameter and an elongation at break of the flame retardant and antistatic regenerated polyester wig fiber obtained in the Examples 13-21 were measured, and a mass, suppleness, and a combing property of an equivalent amount of regenerated polyester wig fibers were evaluated based on sensory assessment, with human straight hair as a Contrast Example. The results were shown in Table 1.

TABLE 1

Test results of diameter, elongation at break, mass, suppleness, and combing property of human straight hair and samples in Examples 13-21 of the present disclosure

| Groups | Diameter (μm) | Elongation at break (%) | Mass | Suppleness | Combing property |
| --- | --- | --- | --- | --- | --- |
| Human straight hair | 81.02 | 59 | Relatively light | Relatively high | Very easy to comb |
| Example 13 | 80.64 | 55 | Relatively light | Relatively high | Very easy to comb |
| Example 14 | 82.40 | 54 | Relatively light | Relatively high | Very easy to comb |
| Example 15 | 80.71 | 53 | Relatively light | Relatively high | Very easy to comb |
| Example 16 | 81.97 | 52 | Relatively light | Relatively high | Very easy to comb |
| Example 17 | 82.96 | 53 | Relatively light | Relatively high | Very easy to comb |
| Example 18 | 82.22 | 54 | Relatively light | Relatively high | Very easy to comb |
| Example 19 | 80.03 | 52 | Relatively light | Relatively high | Very easy to comb |
| Example 20 | 82.46 | 53 | Relatively light | Relatively high | Very easy to comb |
| Example 21 | 81.18 | 54 | Relatively light | Relatively high | Very easy to comb |

From Table 1, it can be observed that the wig fibers obtained in Examples 13-21 of the present disclosure exhibited no significant difference in quality compared to the human straight hair. Moreover, the wig fibers obtained in Examples 13-21 had no significant difference in terms of elongation at break, suppleness, and combing property when compared to the human straight hair. This indicated that the flame retardant and antistatic regenerated polyester wig fiber obtained in the present disclosure possesses excellent suppleness, elasticity, and abrasion resistance.

To further illustrate the flame retardant, antistatic, and antibacterial properties of the wig fibers obtained in Embodiments 13-21, antibacterial property test, Limiting Oxygen Index (LOI) test, and Vertical Burning test (UL 94) were conducted on the samples in the Examples 13-21.

Test Methods

Antibacterial property test: a certain concentration of bacterial liquid was placed on the samples, cultured for a certain period, and a count of remaining bacterial was measured to determine an antibacterial rate of the composite material. The bacterial strains used were *Staphylococcus aureus*, *Escherichia coli*, and *Candida albicans*.

Limiting Oxygen Index (LOI) test: the LOI was conducted according to the national standard GB/T5454-1997.

Vertical Burning test (UL 94): the vertical burning test was conducted according to the national standard GB/T5455-2004. The test ratings included HB, V-2, V-1, and V-0.

Antistatic property test: 15 g of fiber was weighed after drying a fiber degreaser, and a volume resistivity was measured using a fiber specific resistance meter. The volume resistivity (p) was calculated according to Formula (1):

$$\rho = Rbhf/L \qquad (1)$$

Where R denotes an average fiber resistance; b denotes an effective length of an electrode plate (5 cm in the test); h denotes a height of the electrode plate (7.5 cm in the test); L denotes a distance between the electrode plates (2 cm in the test); and f denotes a standard fiber filling fraction (0.23 in the test).

The flame retardant, antistatic and antibacterial properties of the samples in Examples 13-21 were shown in Table 2.

seconds without any dripping, demonstrating the wig fibers have excellent flame retardant property. From the comparison of the Example 13 with the Examples 14-15, it can be seen that as the proportion of the composite flame retardant in the modified flame retardant regenerated polyester masterbatch increased, the flame retardant property of the fibers gradually improved. From the comparison of the Example 13 with the Examples 16-17, it can be seen that when a same amount of composite flame retardant was added to the modified flame retardant regenerated polyester masterbatch, different mass ratios of PSPPP, DOPO-FT, and DOPO-TPN affected the flame retardant property of the fibers. Although all samples exerted good flame retardant property, the Example 13 exhibited the highest LOI and the best flame retardant property, indicating that the mass ratio and the amount of the composite flame retardant in the Example 13 were the optimal parameters. From the results in Table 2, it can be seen that the volume resistivity (p) of wig fibers of the Examples 13-21 fell within a same order of magnitude, indicating that the obtained wig fibers all possessed excellent antistatic property. The antistatic properties of the wig fibers obtained in the Examples 14-17 were comparable. A smaller volume resistivity indicates a better antistatic property of the fiber. From the comparison of the Examples 13 with the Examples 17-19, it can be seen that as the proportion of the biomass-derived graphene in the modified antistatic regenerated polyester masterbatch increased, the antistatic property of the fiber improved. Accordingly, the amount of the biomass-derived graphene in the Example 13 was an optimal parameter. Moreover, the wig fibers obtained in the Examples 13-21 exhibited antibacterial rates over 99% against *Staphylococcus aureus*, *Escherichia coli*, and *Candida albicans*, demonstrating excellent antibacterial properties. These results indicate that the wig fibers of the present disclosure possess outstanding flame retardant, antistatic, and antibacterial properties, ensuring the safety of users.

The key technical points of the present disclosure are causing that the produced wig fibers possessed flame retardant, antistatic, and antibacterial properties as the modified

TABLE 2

Flame retardant, antistatic and antibacterial properties of the samples in Examples 13-21

| Samples | LOI (%) | UL 94 | $\rho/\Omega \cdot cm$ | Antibacterial rate (%) | | |
|---|---|---|---|---|---|---|
| | | | | *Staphylococcus aureus* | *Escherichia coli* | *Candida albicans* |
| Example 13 | 43 | V-0 | $2.94 \times 10^7$ | >99 | >99 | >99 |
| Example 14 | 38 | V-0 | $3.21 \times 10^7$ | >99 | >99 | >99 |
| Example 15 | 40 | V-0 | $3.09 \times 10^7$ | >99 | >99 | >99 |
| Example 16 | 39 | V-0 | $2.99 \times 10^7$ | >99 | >99 | >99 |
| Example 17 | 41 | V-0 | $3.17 \times 10^7$ | >99 | >99 | >99 |
| Example 18 | 42 | V-0 | $8.49 \times 10^7$ | >95 | >95 | >95 |
| Example 19 | 42 | V-0 | $6.34 \times 10^7$ | >97 | >97 | >97 |
| Example 20 | 40 | V-0 | $4.81 \times 10^7$ | >97 | >97 | >97 |
| Example 21 | 41 | V-0 | $3.99 \times 10^7$ | >97 | >97 | >97 |

From the results in Table 2, the wig fibers obtained in the Examples 13-21 of the present disclosure all achieved a V-0 rating in the UL 94 vertical burning test; and the LOI ranged from 38% to 43%, indicating that the fibers belong to flame retardant materials. After igniting the fiber bundles for 10 seconds twice, the flames were extinguished within 30 flame retardant regenerated polyester masterbatch obtained by the modification of regenerated polyester. In order to further demonstrate the advantages of the compositions of the present disclosure, the LOI test, the UL 94, the antistatic property test, and the antibacterial property test were conducted based on different test groups and Examples.

1. LOI Test and UL 94 Test

Sample Preparation and Grouping

Sample group 1: the sample was prepared according to Example 13.

Sample group 2: compared with Example 13, the difference was that the composite flame retardant in the modified flame retardant regenerated polyester masterbatch prepared in Example 5 was composed of PSPPP and DOPO-FT with a mass ratio of 3:0.5.

Sample group 3: compared with Example 13, the difference was that the composite flame retardant in the modified flame retardant regenerated polyester masterbatch prepared in Example 5 was composed of PSPPP and DOPO-TPN with a mass ratio of 3:5.

Sample group 4: compared with Example 13, the difference was that the composite flame retardant in the modified flame retardant regenerated polyester masterbatch prepared in Example 5 was composed of DOPO-FT and DOPO-TPN with a mass ratio of 0.5:5.

Sample group 5: compared with Example 13, the difference was that the modified flame retardant regenerated polyester masterbatch prepared in Example 5 was not added, 80 parts of the regenerated polyester was added, and a composite flame retardant composed of PSPPP, DOPO-FT, and DOPO-TPN with a mass ratio of 3:0.5:5 and accounting for 9.4% of the 80 parts of regenerated polyester was directly added.

Wig fibers of sample groups 1-5 were prepared, respectively according to the above compositions.

Test Method

LOI test: The LOI test was conducted according to the national standard GB/T5454-1997.

UL 94: The UL 94 was conducted according to the national standard GB/T5455-2004. The test ratings include NR, V-2, V-1, and V-0.

The flame retardant properties of samples in sample groups 1-5 were shown in Table 3.

TABLE 3

Flame retardant properties of samples in sample groups 1-5

| Sample group | Sample group 1 | Sample group 2 | Sample group 3 | Sample group 4 | Sample group 5 |
|---|---|---|---|---|---|
| LOI (%) | 43 | 33 | 37 | 34 | 32 |
| UL 94 | V-0 | V-0 | V-0 | V-0 | V-0 |

The flame retardant property of the regenerated polyester cannot meet the requirements in practical applications. Therefore, the flame retardant property of wig fibers prepared without the flame retardant is not illustrated by comparison. In recent years, halogen-based flame retardants have dominated the flame retardant market due to their relatively low cost and high flame retardant efficiency. However, the halogen-based flame retardants release a large amount of hydrogen halide gas during combustion, which is highly corrosive and may cause secondary hazards. As a result, non-halogen flame retardants have received increasing attention. Nitrogen-phosphorus-based flame retardants are currently favored as the most environmentally-friendly flame retardants. In the present disclosure, three nitrogen-phosphorus-based flame retardant combinations, namely PSPPP, the derivative of DOPO-FT, and DOPO-TPN were selected purposely to modify the regenerated polyester in situ, thereby obtaining the modified flame retardant regenerated polyester masterbatch. The flame retardant effects of the wig fibers prepared from the modified masterbatches prepared from different flame retardants were tested. The results were shown in Table 3.

The LOIs of the wig fibers in sample groups 1-5 were above 32%, and the wig fibers all achieved a UL 94 rating of V-0, indicating that the flame retardant significantly improved the flame retardant property of the fibers, and the prepared wig fibers were all flame retardant materials. The LOI of sample group 1 was 43%, while the LOI of sample group 5 was 32%, significantly lower than that of sample group 1, indicating that the wig fiber in sample group 5 was directly obtained by a mixture of the composite flame retardant, the regenerated polyester, and other components through melt spinning. Although the wig fiber in sample group 5 was also the flame retardant material, the flame retardant property was much lower than that of the wig fiber in sample group 1. Modifying the waste bottle flake in situ made the flame retardant be more tightly connected to BHET monomers during the polymerization process, resulting in improved flame retardant property of the modified flame retardant regenerated polyester. The LOIs of sample groups 2-4 were 33-37%, while the LOI of sample group 1 was 43%, significantly higher than those of sample groups 2-5, indicating that a combination of the three flame retardants achieved significantly higher flame retardant effects compared to the use of two flame retardants. The combination of the PSPPP, the derivative of DOPO-FT, and the DOPO-TPN, which are nitrogen-phosphorus-based flame retardants, exhibited a synergistic effect, providing flame retardancy in both a condensed phase and a gas phase, significantly reducing sensitivity of the wig fibers to flame, and enhancing the flame retardant property of the wig fibers.

2. Antistatic and Antibacterial Property Test

Sample Preparation and Grouping

Sample group 1: the sample was prepared according to Example 13.

Sample group 2: compared with Example 13, the different was that the modified antistatic regenerated polyester masterbatch prepared in Example 10 was not added, and 75 parts of the regenerated polyester was added.

Sample group 3: compared with Example 13, the different was that the biomass-derived graphene used in the preparation of the modified antistatic regenerated polyester masterbatch was replaced with regular graphene with a same volume of addition.

Sample group 4: compared with Example 13, the different was that the modified antistatic regenerated polyester masterbatch prepared in Example 10 was not added, 75 parts of the regenerated polyester was added, and biomass-derived graphene accounting for 5% of the mass of the 75 parts of regenerated polyester was directly added.

Wig fibers in sample groups 1-4 were prepared according to the above compositions.

Antistatic property test: 15 g of fiber was weighed after drying a fiber degreaser, and a volume resistivity was measured using a fiber specific resistance meter. The volume resistivity (ρ) was calculated according to Formula (1):

$$\rho = Rbhf/L \quad (1)$$

Where R denotes an average fiber resistance; b denotes an effective length of an electrode plate (5 cm in the test); h denotes a height of the electrode plate (7.5 cm in the test); L denotes a distance between the electrode plates (2 cm in the test), and f denotes a standard fiber filling fraction (0.23 in the test).

Antibacterial property test method: a certain concentration of bacterial solution was placed on the sample and incubated for a certain period of time. An antibacterial rate of the composite material was determined by measuring a count of remaining bacteria. The bacterial strains used were *Staphylococcus aureus, Escherichia coli*, and *Candida albicans*.

The antibacterial properties of samples in sample groups 1~4 were shown in Table 4.

TABLE 4

Antistatic and antibacterial properties of samples in sample groups 1-4

| Sample group | $\rho/\Omega \cdot cm$ | Antibacterial rate (%) | | |
|---|---|---|---|---|
| | | *Staphylococcus aureus* | *Escherichia coli* | *Candida albicans* |
| 1 | $2.94 \times 10^7$ | >99 | >99 | >99 |
| 2 | $5.78 \times 10^{10}$ | — | — | — |
| 3 | $4.29 \times 10^8$ | >87 | >87 | >87 |
| 4 | $1.01 \times 10^8$ | >92 | >92 | >92 |

From the comparison of the volume resistivities (p) of sample groups 1, 3, and 4 with sample group 2, it can be seen that adding a certain amount of graphene during the fiber preparation process effectively reduced the p of the fibers by 2-3 orders of magnitude, indicating that graphene effectively enhanced the antistatic property of the wig fiber; and adding a certain amount of graphene significantly imparted antibacterial property to the wig fiber. From the comparison of sample groups 1 and 3, the p of the fiber in sample group 1 was significantly lower than that in sample group 3 by one order of magnitude, and the antibacterial rates against *Staphylococcus aureus, Escherichia coli*, and *Candida albicans* reached 99%, significantly higher than the antibacterial rate of 87% in sample group 3, indicating that the biomass-derived graphene used in the present disclosure enhanced the antibacterial and antistatic properties of the wig fiber more effectively than regular graphene. From the comparison of sample groups 1 and 4, the p of the fiber in sample group 1 was significantly lower than that in sample group 4 by one order of magnitude, and the antibacterial rate was also significantly higher than the 92% in sample group 4, indicating that modifying the waste bottle flake in situ made the biomass-derived graphene be more tightly connected to the BHET monomers during the polymerization process, and resulting in improved antistatic and antibacterial properties of the modified antistatic regenerated polyester.

The above examples are only intended to illustrate the technical solutions of the present disclosure, and should not be construed as limiting the scope of the disclosure. Although the examples described above provide detailed explanations of the present disclosure, those skilled in the art should understand that modifications may still be made to the disclosed technical solutions or equivalent substitutions of some technical features. Such modifications or substitutions do not depart from the essence and scope of the technical solutions of the various examples of the present disclosure.

What is claimed is:

1. A flame retardant and antistatic regenerated polyester wig fiber, which is made of following components in parts by weight: 40-50 parts of regenerated polyester, 20-30 parts of modified flame retardant regenerated polyester masterbatch, 15-25 parts of modified antistatic regenerated polyester masterbatch, 1-2 parts of colorant, 3-5 parts of additive, 1.5-3 parts of dispersant, and 1-1.5 parts of plasticizer, wherein a composite flame retardant composed of poly(sulfonyl-diphenylene phenylphosphonate) (PSPPP), a derivative of 9,10-dihydro-9-oxa-10-phosphaphenanthrene-10-oxide (DOPO-FT), and 9,10-dihydro-9-oxa-10-phosphaphenanthrene-10-oxide triphosphonitrile (DOPO-TPN), and biomass-derived graphene are subjected to a re-polymerization reaction with an alcoholysis product BHET of a waste PET bottle flake, respectively, to obtain the modified flame retardant regenerated polyester masterbatch and the modified antistatic regenerated polyester masterbatch;

the modified flame retardant regenerated polyester masterbatch includes the composite flame retardant composed of PSPPP, DOPO-FT, and DOPO-TPN with a mass ratio of (2-4):(0.5-2):(3-5); and the modified antistatic regenerated polyester masterbatch includes the biomass-derived graphene.

2. The flame retardant and antistatic regenerated polyester wig fiber of claim 1, wherein the colorant is at least one of a color powder, a pigment, or a color masterbatch; the additive is one or more of nano-calcium carbonate, silica dioxide, talcum powder, silicon micro-powder, titanium dioxide, or a glass microsphere; the dispersant is ethylene bis-stearamide or polyethylene wax with a molecular weight of 2600-3000; and the plasticizer is acetyl tributyl citrate.

3. The flame retardant and antistatic regenerated polyester wig fiber of claim 1, wherein the modified flame retardant regenerated polyester is prepared by following steps:

(1) cutting, grinding, washing, and drying the waste PET bottle flake to keep a moisture content within 50 ppm to obtain waste PET bottle flake powder;

(2) placing the waste PET bottle flake powder obtained in step (1) into an alcoholysis reactor, and adding an ethylene glycol solution by a weight of 4-6 times a weight of the waste PET bottle flake powder, zinc acetate in a weight ratio of 4-8% to a total weight of the waste PET bottle flake powder, and ethylene terephthalate (BHET) in a weight ratio of 1-3% to the total weight of the waste PET bottle flake powder into the alcoholysis reactor, conducting an alcoholysis reaction at a temperature of 210° C.-250° C. and a vacuum degree of 0.3-0.5 MPa for 15-25 min, and then filtering a molten PET bottle flake material after alcoholysis to obtain an alcoholysis product BHET;

(3) preparing a flame retardant suspension with the composite flame retardant composed of the PSPPP, the derivative of DOPO-FT, and the DOPO-TPN with the mass ratio of (2-4):(0.5-2):(3-5) and ethylene glycol by ultrasonic oscillation; and (4) adding the alcoholysis product BHET obtained in step (2) and the flame retardant suspension obtained in step (3) into a polymerization reactor together with antimony trioxide and polyphosphoric acid to react at a temperature of 265° C.-275° C. for 4-5 h while maintaining a vacuum degree of 0.9-1 MPa, which is regarded as a system, then causing the system at 25° C. and 0.1 MPa at a uniform speed of 5° C./min and 16 kPa/min after the reaction, and then cooling in a cold water tank and pelletizing to obtain the modified flame retardant regenerated polyester masterbatch.

4. The flame retardant and antistatic regenerated polyester wig fiber of claim 1, wherein the modified antistatic regenerated polyester is prepared by following steps:

(1) cutting, grinding, washing, and drying the waste PET bottle flake to keep the moisture content within 50 ppm to obtain waste PET bottle flake powder;

(2) placing the waste PET bottle flake powder obtained in step (1) into an alcoholysis reactor and adding an ethylene glycol solution 4-6 times the weight of the waste PET bottle flake powder, adding zinc acetate in a weight ratio of 4-8% to a total mass of the waste PET bottle flake powder, and adding ethylene terephthalate (BHET) in a weight ratio of 1-3% to the total mass of the waste PET bottle flake powder, respectively to conduct an alcoholysis reaction at 210-250° C. and 0.3-0.5 MPa for 15-25 min, and then filtering a molten PET bottle flake material after alcoholysis to obtain the alcoholysis product BHET;

(3) preparing an antistatic suspension: preparing a uniform antistatic suspension with the biomass-derived graphene and ethylene glycol by ultrasonic oscillation; and (4) adding the alcoholysis product BHET obtained in step (2) and the antistatic suspension obtained in step (3) into a polymerization reactor together with antimony trioxide and polyphosphoric acid to react at 255° C.-265° C. for 3-4 h while maintaining a vacuum degree of 1-1.2 MPa to obtain a system, then reducing the system to 25° C. and 0.1 MPa at a uniform speed of 5° C./min and 16 kPa/min after the reaction, and then cooling in a cold water tank and pelletizing to obtain the modified antistatic regenerated polyester masterbatch.

5. The flame retardant and antistatic regenerated polyester wig fiber of claim 3, wherein a weight ratio of a total weight of the composite flame retardant in the flame retardant suspension added in step (4) to a weight of the alcoholysis product BHET is 15-25%.

6. The flame retardant and antistatic regenerated polyester wig fiber of claim 4, wherein a total weight of the biomass-derived graphene in the antistatic suspension added in step (4) accounts for 10-15% of the weight ratio of the alcoholysis product BHET.

7. The flame retardant and antistatic regenerated polyester wig fiber of claim 1, wherein the flame retardant and antistatic regenerated polyester wig fiber is prepared by following steps:

(1) taking raw materials in parts by weight, including: 40-50 parts of the regenerated polyester, 20-30 parts of the modified flame retardant regenerated polyester pellet, 15-25 parts of the modified antistatic regenerated polyester masterbatch, 1-2 parts of the colorant, 3-5 parts of the additive, 1.5-3 parts of the dispersant, and 1-1.5 parts of the plasticizer, and drying the raw materials at a temperature of 85° C.-95° C. to remove moisture, a total drying time being 5-7 h, and a moisture content of the raw materials being controlled within 50 ppm;

(2) feeding the raw materials obtained in step (1) into a single-screw extruder for screw melting extrusion to obtain a primary fiber, wherein an aperture of a spinneret is in a range of 0.5 mm to 1 mm, and a temperature of the single-screw extruder is in a range of 240° C. to 260° C.;

(3) cooling the primary fiber obtained in step (2) using a blowing or side blowing manner with a cooling ring with 1 m-5 m at an air temperature of 0-15° C.;

(4) applying oil to the primary fiber obtained in step (3) with an oil roller to obtain an oiled primary fiber, stretching the oiled primary fiber using a drawing machine to obtain a fiber bundle, and collecting the fiber bundle using a winding machine to obtain a fiber roll, wherein a stretching temperature during a stretching process is in a range of 110° C. to 120° C., and a rotation speed is in a range of 500 m/min to 550 m/min; the oil is one or more of a polyether-based polymer, a fatty acid-based polymer, an organic amine salt compound, or an organic silicone compound; and the drawing machine has 6-10 rolls with a draw ratio of 3.2-5.8 times;

(5) placing the fiber roll obtained in step (4) in a bundling frame to guide the fiber bundle into a heat setting box through a traction roller to conduct a heat setting process, wherein a length of the heat setting box is in a range of 2 to 18 m, a working temperature of a heat setting machine is in a range of 170 to 180° C., a feeding speed of the fiber bundle is in a range of 5 m/min to 10 m/min, and a residence time of the fiber bundle in the heat setting box is in a range of 10 to 15 min; and (6) after the heat setting process is completed, obtaining the flame retardant and antistatic regenerated polyester wig fiber by collecting and packaging the fiber bundle obtained in step (5) through a fiber collecting machine.

\* \* \* \* \*